(12) United States Patent
Pritchard et al.

(10) Patent No.: US 10,221,896 B2
(45) Date of Patent: Mar. 5, 2019

(54) POWERTRAIN ROTATIONAL DISCONNECT ASSEMBLY

(71) Applicant: BorgWarner Inc., Auburn Hills, MI (US)

(72) Inventors: Larry A. Pritchard, Macomb, MI (US); Thaddeus Kopp, Oakland Township, MI (US)

(73) Assignee: BorgWarner Inc., Auburn Hills, MI (US)

(*) Notice: Subject to any disclaimer, the term of this patent is extended or adjusted under 35 U.S.C. 154(b) by 384 days.

(21) Appl. No.: 15/054,457

(22) Filed: Feb. 26, 2016

(65) Prior Publication Data

US 2016/0265600 A1  Sep. 15, 2016

Related U.S. Application Data

(60) Provisional application No. 62/130,671, filed on Mar. 10, 2015.

(51) Int. Cl.

| F16D 11/10 | (2006.01) |
|---|---|
| F16D 27/00 | (2006.01) |
| F16D 27/118 | (2006.01) |
| F16D 27/14 | (2006.01) |
| F16D 11/00 | (2006.01) |

(52) U.S. Cl.
CPC ............ F16D 11/10 (2013.01); F16D 27/004 (2013.01); F16D 27/118 (2013.01); *F16D 27/14* (2013.01); *F16D 2011/002* (2013.01); *F16D 2027/008* (2013.01)

(58) Field of Classification Search
CPC .. F16D 11/10; F16D 2011/002; F16D 27/004; F16D 27/108; F16D 27/118; F16D 27/14; B60K 2023/0858; B60K 17/3515
See application file for complete search history.

(56) References Cited

U.S. PATENT DOCUMENTS

| 3,683,239 A | 8/1972 | Sturman |
|---|---|---|
| 6,935,478 B2 | 8/2005 | Dräger et al. |
| 7,843,293 B1 | 11/2010 | Bonjean et al. |
| 8,810,348 B2 | 8/2014 | Fullerton et al. |

(Continued)

*Primary Examiner* — Robert W Hodge
*Assistant Examiner* — Lori Wu
(74) *Attorney, Agent, or Firm* — Howard & Howard Attorneys PLLC (57) ABSTRACT

A disconnect assembly for translating torque to shafts of a driveline. A clutch is disposed in torque translating relationship between the shafts and is movable between an engaged configuration wherein torque is translated, and a disengaged configuration wherein torque is interrupted. An actuator includes a coil that generates a first magnetic field. A slider is movable between a first stable position and a second stable position, with an armature operatively attached to the slider. The armature has a magnetic polarity pattern defined by a plurality of north and south magnetic pole regions facing the coil. The pattern configured such that predetermined changes in the magnetic field generated by the coil urge the slider from one of the stable positions to the other of the stable positions so as to cause corresponding movement of the clutch assembly between the configurations to selectively translate rotational torque between the shafts of the driveline.

18 Claims, 7 Drawing Sheets

(56) References Cited

U.S. PATENT DOCUMENTS

| | | | |
|---|---|---|---|
| 2011/0083935 A1* | 4/2011 | Katano | F16D 27/004 |
| | | | 192/84.31 |
| 2013/0222091 A1 | 8/2013 | Fullerton et al. | |
| 2014/0205468 A1 | 7/2014 | Pritchard | |
| 2015/0014116 A1* | 1/2015 | Kimes | F16D 41/16 |
| | | | 192/84.1 |
| 2016/0036311 A1* | 2/2016 | Lee | H02K 9/108 |
| | | | 310/103 |
| 2016/0217896 A1* | 7/2016 | Gilmore | H01F 7/1615 |

* cited by examiner

POWERTRAIN ROTATIONAL DISCONNECT ASSEMBLY

CROSS-REFERENCE TO RELATED APPLICATIONS

The present application claims priority to and all the benefits of U.S. Provisional Patent Application No. 62/130,671, filed on Mar. 10, 2015, which is hereby expressly incorporated herein by reference in its entirety.

BACKGROUND OF INVENTION

1. Field of Invention

The present invention relates, generally, to automotive powertrain systems and, more specifically, to a disconnect assembly for powertrain systems.

2. Description of the Related Art

Conventional automotive vehicles known in the art include a powertrain system in rotational communication with one or more drivelines. Typically, the vehicle includes a pair of drivelines, each defined by a respective pair of opposing wheels. The powertrain system includes a propulsion system adapted to generate and selectively translate rotational torque to one or more of the wheels so as to drive the vehicle. To that end, in conventional automotive powertrain systems, the propulsion system is typically realized as an internal combustion engine in rotational communication with a transmission. The engine generates rotational torque which is selectively translated to the transmission which, in turn, translates rotational torque to one or more of the drivelines. The transmission multiplies the rotational speed and torque generated by the engine through a series of predetermined gear sets, whereby changing between gear sets enables the vehicle to travel at different vehicle speeds for a given engine speed.

In so-called "four-wheel-drive" or "all-wheel-drive" powertrain systems, both drivelines are used to drive the vehicle. To that end, all wheel drive powertrain systems typically include a transfer case disposed in rotational communication with the transmission and adapted to split rotational torque between the drivelines. The transfer case may be spaced from the transmission, or may be integrated with the transmission. Where the transfer case is spaced from the transmission, a driveshaft is used to translate rotational torque from the transmission to the transfer case. Driveshafts are also typically used to connect the transfer case to each respective driveline. Conventional drivelines are commonly realized by a differential assembly adapted to receive rotational torque from the transfer case and subsequently split rotational torque between opposing wheels. To that end, each driveline also typically includes a pair of continuously-variable joints disposed in torque translating relationship with the differential and each respective opposing wheel.

Depending on the specific configuration of the powertrain system, the percentage of torque split between the drivelines may vary. Moreover, depending on the vehicle application, the transfer case and/or driveline(s) may be configured to interrupt rotational torque to one of the drivelines under certain operating conditions. Specifically, the powertrain system may be configured such that the vehicle can be selectively operated in "two-wheel-drive" or in "four-wheel-drive". Moreover, the powertrain system may be configured to automatically and continuously control how much rotational torque is sent to each driveline. Thus, the powertrain system may be configured to send a higher percentage of available torque to one of the drivelines under certain vehicle operating conditions, and a lower percentage of available torque to the same driveline under different vehicle operating conditions. By way of non-limiting example, the powertrain system may be configured such that 80% of torque is sent to a front driveline and 20% of torque is sent to a rear driveline until there is a loss of traction or wheel spin, whereby the powertrain subsequently adjusts torque split such that 50% of torque is sent to each driveline.

Depending on the vehicle application, rotational torque may only be required at both drivelines relatively infrequently. Thus, the vehicle may be designed to operate primarily in "two-wheel-drive" so as to minimize parasitic loss and optimize powertrain system efficiency. Moreover, optimizing how torque is split between drivelines can lead to significant improvements in vehicle efficiency. Thus, in order to decrease parasitic losses in the powertrain system, it is advantageous to selectively disconnect one or more driveshafts and/or continuously-variable joints from rotational communication with the transfer case, transmission, and/or differentials. To that end, rotational disconnects are used to selectively interrupt rotation between powertrain system components, whereby a controller and an actuator are typically used to selectively control the rotational disconnect. The controller energizes the actuator which, in turn, engages the rotational disconnect so as to couple (or, de-couple) the powertrain system components.

Each of the components and systems of the type described above must cooperate to effectively and selectively translate rotational torque to the driven wheels of the vehicle. In addition, each of the components and systems must be designed not only to facilitate improved performance and efficiency, but also so as to reduce the cost and complexity of manufacturing vehicles. While powertrain rotational disconnect systems known in the related art have generally performed well for their intended use, there remains a need in the art for a rotational disconnect assembly that has superior operational characteristics and a reduced overall packaging size, and, at the same time, that reduces the cost and complexity of manufacturing vehicles that operate with high efficiency under a number of different driving conditions.

SUMMARY OF THE INVENTION

The present invention overcomes the disadvantages in the related art in a disconnect assembly for use in selectively translating rotational torque between a first shaft and a second shaft of a vehicle driveline. The disconnect assembly includes a clutch assembly and an electromagnetic actuator. The clutch assembly is disposed in selective torque translating relationship between the first shaft and the second shaft, and is movable between: an engaged configuration wherein rotational torque is translated between the first shaft and the second shaft, and a disengaged configuration wherein rotational torque is interrupted between the first shaft and the second shaft. The electromagnetic actuator includes a coil, a slider, and an armature. The coil acts to selectively generate a first magnetic field. The slider is disposed in torque translating relationship with the clutch assembly and is selectively movable between a first stable position and a second stable position. The armature is operatively attached to the slider and has a predetermined magnetic polarity pattern defined by a plurality of north and south magnetic pole regions facing toward the coil. A corresponding plurality of south and north magnetic pole regions face away from the coil. The magnetic polarity pattern is configured such that predetermined changes in the magnetic field generated by the coil urge the slider from one of the stable positions to the other of the stable positions so as to cause corresponding movement of the clutch assembly between the configurations to selectively translate rotational torque between the first shaft of the driveline and the second shaft of the driveline.

In this way, the disconnect assembly of the present invention significantly improves the performance of vehicle powertrain systems by enabling simple and space-efficient implementation of selective rotational torque interruption. More specifically, those having ordinary skill in the art will appreciate that the disconnect assembly of the present invention is configured such that the coil of the actuator need not be continually supplied with electrical current to maintain the relative clutch assembly configuration. Moreover, it will be appreciated that the magnetic polarity pattern of the armature can be configured so as to significantly minimize the overall packaging size of the actuator and disconnect assembly while, at the same time, affording significant improvements in vehicle powertrain functionality. Further, the present invention can be used in connection with a number of different types of powertrain systems, and in a number of different ways. Further still, the present invention reduces the cost and complexity of manufacturing vehicles that have superior operational characteristics, such as high efficiency, reduced weight, component packaging, component life, and vehicle drivability.

BRIEF DESCRIPTION OF THE DRAWINGS

Other objects, features, and advantages of the present invention will be readily appreciated as the same becomes better understood after reading the subsequent description taken in connection with the accompanying drawings wherein.

DETAILED DESCRIPTION OF THE INVENTION

Figure 1:
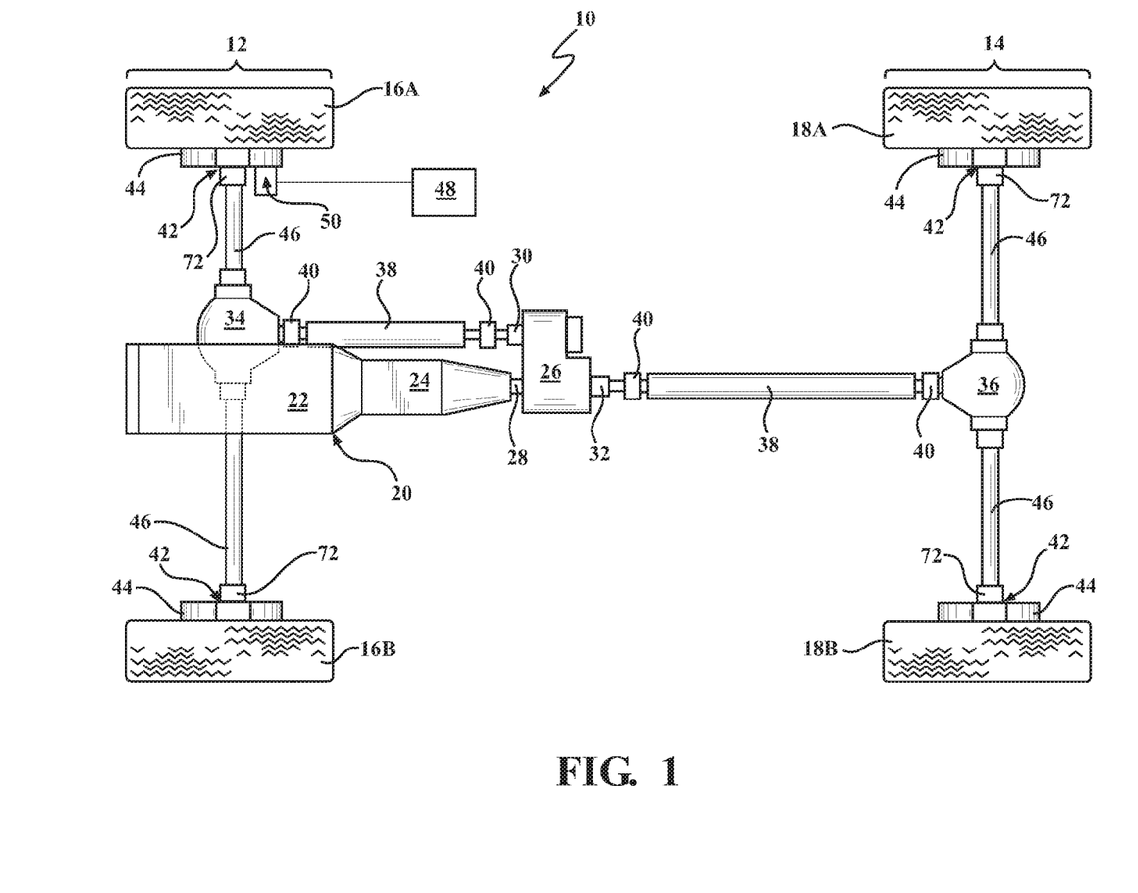
FIG. 1 is a schematic plan view of a vehicle powertrain system including a rotational disconnect assembly mounted to a wheel hub and having an actuator, according to one embodiment of the present invention.

Referring now to the figures, where like numerals are used to designate like structure, a vehicle powertrain system is schematically illustrated at 10 in FIG. 1. The powertrain system 10 includes a first driveline 12 and a second driveline 14. The first driveline 12 includes a first pair of opposing wheels 16A, 16B, and the second driveline 14 includes a second pair of opposing wheels 18A, 18B. Those having ordinary skill in the art will recognize this as a conventional "four wheeled" vehicle design commonly used in automotive applications. However, as will be appreciated from the subsequent discussion below, the vehicle could include any number of drivelines with any suitable number of wheels without departing from the scope of the present invention. The powertrain system 10 also includes a propulsion system 20 that acts to generate and translate rotational torque the first and second drivelines 12, 14. Each of these components and systems will be described in greater detail below.

In the representative example illustrated in FIG. 1, the propulsion system 20 is realized as a conventional internal combustion engine 22 disposed in rotational communication with a transmission 24. The engine 22 generates rotational torque which is selectively translated to the transmission 24 which, in turn, multiplies the rotational speed and torque generated by the engine 22. Those having ordinary skill in the art will appreciate that transmission 24 can be designed in several different ways and, as such, can be disposed in rotational communication with the engine 22 in any suitable way depending on the application. By way of non-limiting example, the transmission 24 could include a gear set (not shown, but generally known in the art) that is either manually or automatically actuated, or the transmission 24 could be continuously variable. Moreover, while FIG. 1 shows the engine 22 and transmission 24 operatively attached to one another, it will be appreciated that the transmission 24 could spaced from the engine 22 so as to improve weight distribution of the vehicle without departing from the scope of the present invention. Further, it will be appreciated that the propulsion system 20, engine 22, and/or transmission 24 could be of any suitable type, configured in any suitable way sufficient to generate and translate rotational torque to the drivelines 12, 14, without departing from the scope of the present invention. By way of non-limiting example, the propulsion system 20 could employ what is commonly referred to in the related art as a "hybrid engine," whereby rotational torque translated to the drivelines 12, 14 is generated by the engine 22 as well as by one or more electric motors (not shown, but generally known in the art). Similarly, the powertrain system 10 could omit an internal combustion engine 22 altogether, such as in a so-called "electric vehicle powertrain" wherein the propulsion system 20 employs one or more electric motors to drive the vehicle (not shown, but generally known in the related art).

The powertrain system 10 also includes a transfer case 26 disposed in rotational communication with the transmission 24. The transfer case 26 is configured to split rotational torque from the transmission 24 between the drivelines 12, 14, as described in greater detail below. In the representative embodiment illustrated herein, the transfer case 26 is situated in-line with the transmission 24 and is disposed in rotational communication therewith via a transmission output shaft 28. However, those having ordinary skill in the art will appreciate that the transfer case 26 and transmission 24 could be disposed in rotational communication with each other in a number of different ways without departing from the scope of the present invention. By way of non-limiting example, the transfer case 26 could be integrated with the transmission 24, or the transmission 24 and transfer case 26 could be offset from one another and could be in rotational communication via an intermediate shaft with one or more universal joints (not shown, but generally known in the art), thereby enabling additional flexibility with respect to weight distribution and packaging of the drivetrain 10.

The transfer case 26 includes a first output 30 and a second output 32 disposed in torque translating relationship with the first driveline 12 and the second driveline 14, respectively. In the representative embodiment illustrated herein, each of the drivelines 12, 14 includes a respective differential assembly 34, 36, a driveshaft 38, and one or more universal joints 40. The driveshaft 38 and universal joints 40 connect the outputs 30, 32 of the transfer case 26 to the respective differentials 34, 36 of the drivelines 12, 14. Thus, the first differential assembly 34 is disposed in torque translating relationship with the first output 30 of the transfer case 26 and translates rotational torque to the first pair of wheels 16A, 16B; and the second differential assembly 36 is disposed in torque translating relationship with the second output 32 of the transfer case 26 and translates rotational torque to the second pair of wheels 18A, 18B. Each of the wheels 16A, 16B, 18A, 18B is mounted to a respective hub assembly 42 configured to facilitate rotation in operation. Similarly, the hub assemblies 42 are each supported by a respective knuckle bracket 44 mounted to the vehicle (not shown in detail, but generally known in the art). In order to translate rotation to the wheels 16A, 16B, 18A, 18B so as to drive the vehicle in operation, each of the drivelines 12, 14 also includes a pair of continuously-variable joints 46. The continuously-variable joints 46 translate rotational torque from the differentials 34, 36 to the wheels 16A, 16B, 18A, 18B. However, those having ordinary skill in the art will appreciate that the drivelines 12, 14 could be configured differently, with or without the use of continuously-variable joints 46, without departing from the scope of the present invention. By way of non-limiting example, it is conceivable that the drivelines 12, 14 could be realized by live axles with integrated hubs (not shown, but generally known in the art).

As will be appreciated from the subsequent description below, the transfer case 26 could be of any suitable type or configuration sufficient to selectively translate rotational torque between the transmission 24 and the drivelines 12, 14 without departing from the scope of the present invention. In traditional "four-wheel-drive" powertrain systems 10, as illustrated in FIG. 1, the transfer case 26 translates rotational torque to the second driveline 14 when the vehicle is operated in "rear-wheel-drive mode," and the transfer case 26 translates rotational torque to both the first and second drivelines 12, 14 when the vehicle is operated in "four-wheel-drive mode". In certain applications, the vehicle driver can decide whether to operate in "two-wheel-drive" or "four-wheel-drive" and can select between the modes using an input control (not shown, but generally known in the art). Alternatively, a controller 48 can be used to automatically move the transfer case 26 between "two-wheel-drive" and "four-wheel-drive" without driver interaction. In other applications, four-wheel-drive powertrain systems 10 are configured as so-called "full-time all-wheel-drive" powertrain systems 10, whereby the transfer case 26 always translates at least some rotational torque to both drivelines 12, 14. The amount of torque translated to each of the drivelines 12, 14 can be allocated according to a fixed ratio, such as via predetermined gearing (not shown, but generally known in the art), or torque can be selectively (or, continuously) adjustable between the drivelines 12, 14 via one or more clutch assemblies (not shown, but generally known in the art).

Irrespective of the specific configuration or type of transfer case 26, it is advantageous to minimize or eliminate parasitic loss, whereby eliminating unnecessary rotation and/or torque translation increases the overall efficiency of the powertrain system 10. To that end, the powertrain system 10 includes a disconnect assembly, generally indicated at 50, configured to selectively interrupt torque translation between various powertrain system 10 components, as described in greater detail below. In the representative embodiment illustrated throughout the figures, the disconnect assembly 50 is assigned to one of the wheels 16A of the first driveline 12. Here, the first differential 34 may be configured as a so-called "open differential" such that translation of rotational torque is effectively interrupted to both of the first pair of wheels 16A, 16B when the disconnect assembly 50 interrupts translation of rotational torque to the assigned wheel 16A.

As noted above, the powertrain system 10 and/or drivelines 12, 14 could be configured in a number of different ways. As such, while a single disconnect assembly 50 is shown in FIG. 1, those having ordinary skill in the art will appreciate that any suitable number of disconnect assemblies 50 could be utilized, disposed in any suitable location and supported in any suitable way, without departing from the scope of the present invention. By way of non-limiting example, where the first differential 34 is configured as a so-called "locking differential" or a "limited slip differential," it is conceivable that a pair of disconnect assemblies 50 could be utilized; one assigned to each wheel 16A, 16B of the first driveline 12. Moreover, while the disconnect assembly 50 is shown throughout the figures as cooperating with the hub assembly 42 and knuckle bracket 44 to facilitate torque translation interruption, those having ordinary skill in the art will appreciate that the disconnect assembly 50 could be disposed in other locations, and/or could cooperate with other powertrain system 10 components, without departing from the scope of the present invention. By way of non-limiting example, it is conceivable that the disconnect assembly 50 could be configured to interrupt rotational torque between the first output 30 of the transfer case 26 and the first driveline 12 (not shown in detail).

Figure 2A:
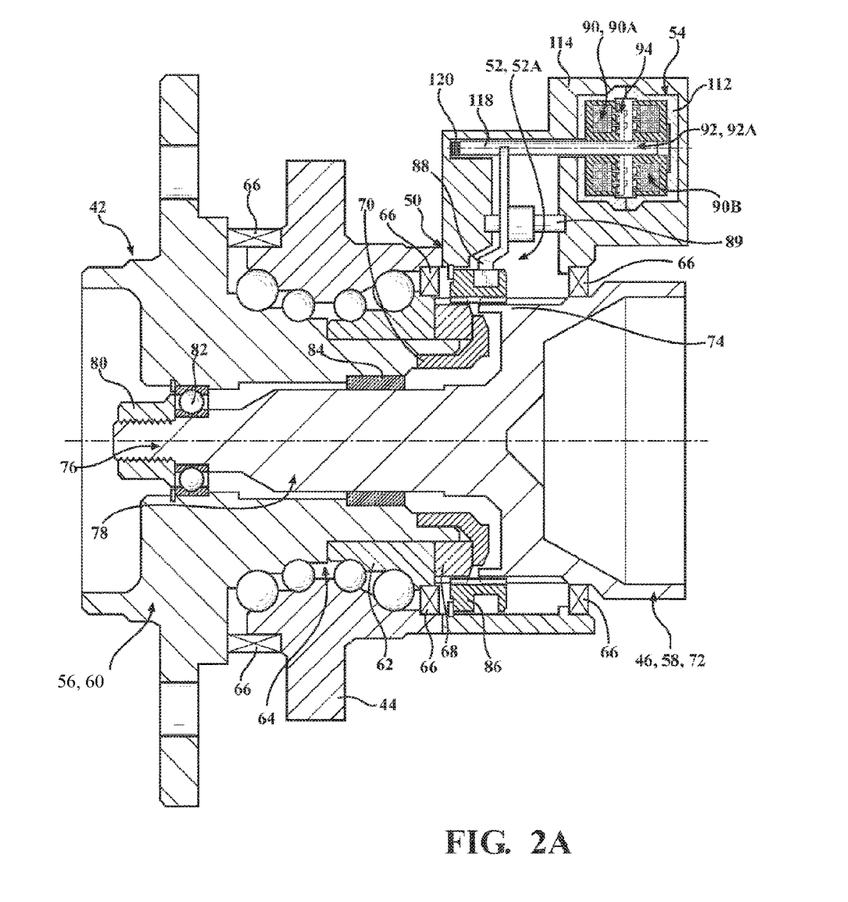
FIG. 2A is a sectional view of the wheel hub and rotational disconnect assembly of FIG. 1 shown in an engaged configuration.
Figure 2B:
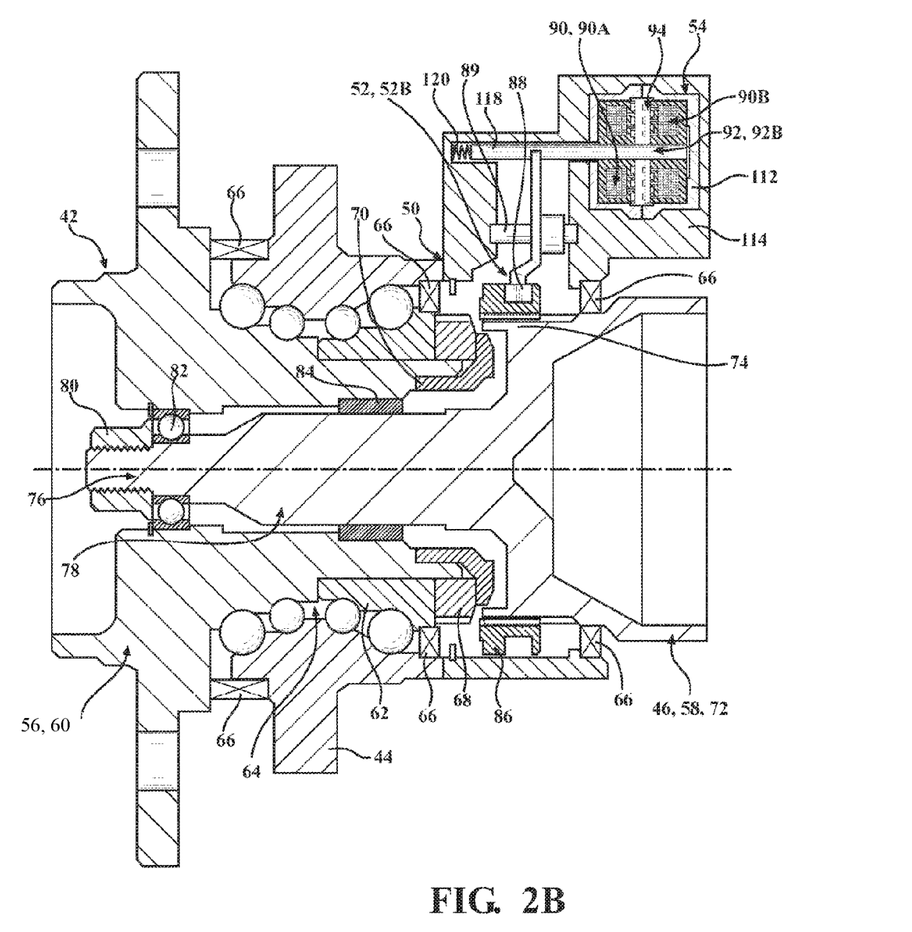
FIG. 2B is a sectional view of the wheel hub and rotational disconnect assembly of FIG. 1 shown in a disengaged configuration.

Referring now to FIGS. 2A and 2B, the disconnect assembly 50 of the present invention includes a clutch assembly, generally indicated at 52, and an electromagnetic actuator, generally indicated at 54. The disconnect assembly 50 is adapted for use in selectively translating rotational torque between a first shaft 56 and a second shaft 58 of an assigned vehicle driveline 12. As noted above, the disconnect assembly 50 can be used in a number of different ways and in a number of different powertrain systems 10. As such, it will be appreciated that the specific configuration of the shafts 56, 58 described herein may vary without departing from the scope of the present invention. Specifically, while the shafts 56, 58 are described in greater detail below as being integrated with the hub assembly 42 and the continuously variable joint 46, respectively, of the assigned wheel 16A of the assigned driveline 12, those having ordinary skill in the art will appreciate that the first shaft 56 and/or second shaft 58 could be of any suitable type or configuration, defined by any suitable part of either driveline 12, 14 of the powertrain system 10, without departing from the scope of the present invention.

As noted above, the disconnect assembly 50 includes a clutch assembly 52 and an electromagnetic actuator 54. The clutch assembly 52 is disposed in selective torque translating relationship between the first shaft 56 and the second shaft 58 and is selectively movable between: an engaged configuration 52A wherein rotational torque is translated between the first shaft 56 and the second shaft 58 (see FIGS. 2A and 3A), and a disengaged configuration 52B wherein rotational torque is interrupted between the first shaft 56 and the second shaft 58 (see FIGS. 2B and 3B). As is described in greater detail below, the electromagnetic actuator 54 is adapted to selectively move the clutch assembly 52 between the configurations 52A, 52B.

As noted above, in the representative embodiment illustrated in FIGS. 2A and 2B, the disconnect assembly 50 cooperates with the hub assembly 42 and knuckle bracket 44 to facilitate selectable rotational torque interruption to the assigned driveline 12. To this end, and as is explained in greater detail below, the hub assembly 42 includes a wheel-side hub member 60, a joint-side hub member 62, and a bearing arrangement 64. The knuckle bracket 44 is mounted to the vehicle (not shown in detail, but generally known in the art) and supports the wheel-side hub member 60, the joint-side hub member 62, and the bearing arrangement 64. In order to ensure long life of the bearing arrangement 64, one or more seals 66 may be operatively attached to the knuckle bracket 44 adjacent to the joint-side hub member 62 and/or the wheel-side hub member 60. The wheel-side hub member 60 is configured so as to allow the assigned wheel 16A to be selectively attached to and removed from the vehicle, as is known in the art. The knuckle bracket 44 may be mounted directly to the vehicle, or may be mounted to another vehicle component, such as a suspension arm or shock absorber strut assembly (not shown, but generally known in the art).

In the representative embodiment illustrated herein, the wheel-side hub member 60 operatively attached to the joint-side hub member 62, with the knuckle bracket 44 and the bearing arrangement 64 disposed therebetween. Thus, the assigned wheel 16A, the wheel-side hub member 60, and the joint-side hub member 62 rotate together in operation and are supported by the knuckle bracket 44. The hub assembly 42 also includes a hub tooth member 68 that cooperates with the clutch assembly 52, as described in greater detail below. The hub tooth member 68 is coupled to and rotates with the wheel-side hub member 60 and the joint-side hub member 62. To this end, and as is shown best in FIG. 2A, a hub collar 70 couples the hub tooth member 68 to the wheel-side hub member 60 and the joint-side hub member 62. In the representative embodiment illustrated herein, the first shaft 56 of the driveline 12 is defined by the "wheel side" components of the hub assembly 42 and clutch assembly 52 that rotate together; specifically, the wheel-side hub member 60, the joint-side hub member 62, the hub tooth member 68, and the hub collar 70. However, as noted above, the various components of the hub assembly 42 and/or clutch assembly 52 could be designed, configured, arranged, supported, and/or defined in any suitable way without departing from the scope of the present invention.

As noted above, the continuously-variable joint 46 is disposed in selective torque translating relationship with the hub assembly 42. To that end, the continuously-variable joint 46 includes a joint end 72 that has a joint tooth portion 74, a joint end portion 76, and a joint body portion 78 extending between the joint tooth portion 74 and the joint end portion 76. The joint tooth portion 74 cooperates with the hub tooth member 68 and other components of the clutch assembly 52 so as to facilitate selective rotational torque interruption between the continuously-variable joint 46 and the hub assembly 42, as described in greater detail below. The joint end portion 76 and the joint body portion 78 cooperate with the hub assembly 42 so as to axially constrain the continuously-variable joint 46 with respect to the hub assembly 42 and allow independent rotation of the hub assembly 42 with respect to the continuously-variable joint 46 when rotational torque is interrupted therebetween. To these ends, an axle nut 80, an end bearing 82, and a joint bushing 84 are provided. The axle nut 80 retains the joint end portion 76 to the wheel-side hub member 60. The end bearing 82 and the joint bushing 84 are operatively attached to the wheel-side hub member 60 and facilitate alignment and selective independent rotation between the hub assembly 42 and continuously-variable joint 46, as noted above. In the representative embodiment illustrated herein, the second shaft 58 of the driveline 12 is defined by the "joint side" components of the hub assembly 42 and clutch assembly 52 that rotate together; specifically, the joint end 72 and the continuously-variable joint 46. However, those having ordinary skill in the art will appreciate that the joint end 72 could be designed or configured in any suitable way, from any suitable number of components, without departing from the scope of the present invention.

As noted above, the clutch assembly 52 is adapted to selectively interrupt rotational torque between the first shaft 56 and the second shaft 58. To that end, in one embodiment, the clutch assembly 52 includes a sleeve 86 that acts to couple the first shaft 56 and the second shaft 58 when the clutch assembly 52 is in the engaged configuration 52A. The sleeve 86 is disposed in force translating relationship with the electromagnetic actuator 54 such that the sleeve 86 couples the hub tooth member 68 to the joint tooth portion 74 when the clutch assembly 52 is in the engaged configuration 52A. When the clutch assembly 52 is in the disengaged configuration 52B, the electromagnetic actuator 54 moves the sleeve 86 away from the hub tooth member 68. To that end, in one embodiment, the clutch assembly 52 further includes a fork 88 operatively attached to the electromagnetic actuator 54 and disposed in force translating relationship with the sleeve 86. Here, the fork 88 is slidably mounted to a fork shaft 89, as described in greater detail below. Those having ordinary skill in the art will recognize the arrangement of the hub tooth member 68, the joint tooth portion 74, the sleeve 86, and the fork 88 as forming what is commonly referred to as a "dog clutch" clutch assembly 52, whereby the hub tooth member 68 and joint tooth portion 74 have external teeth (not shown in detail, but generally known in the related art) that cooperate with internal teeth of the sleeve 86 (not shown in detail, but generally known in the related art) to facilitate selective rotational torque interruption.

Figure 3A:
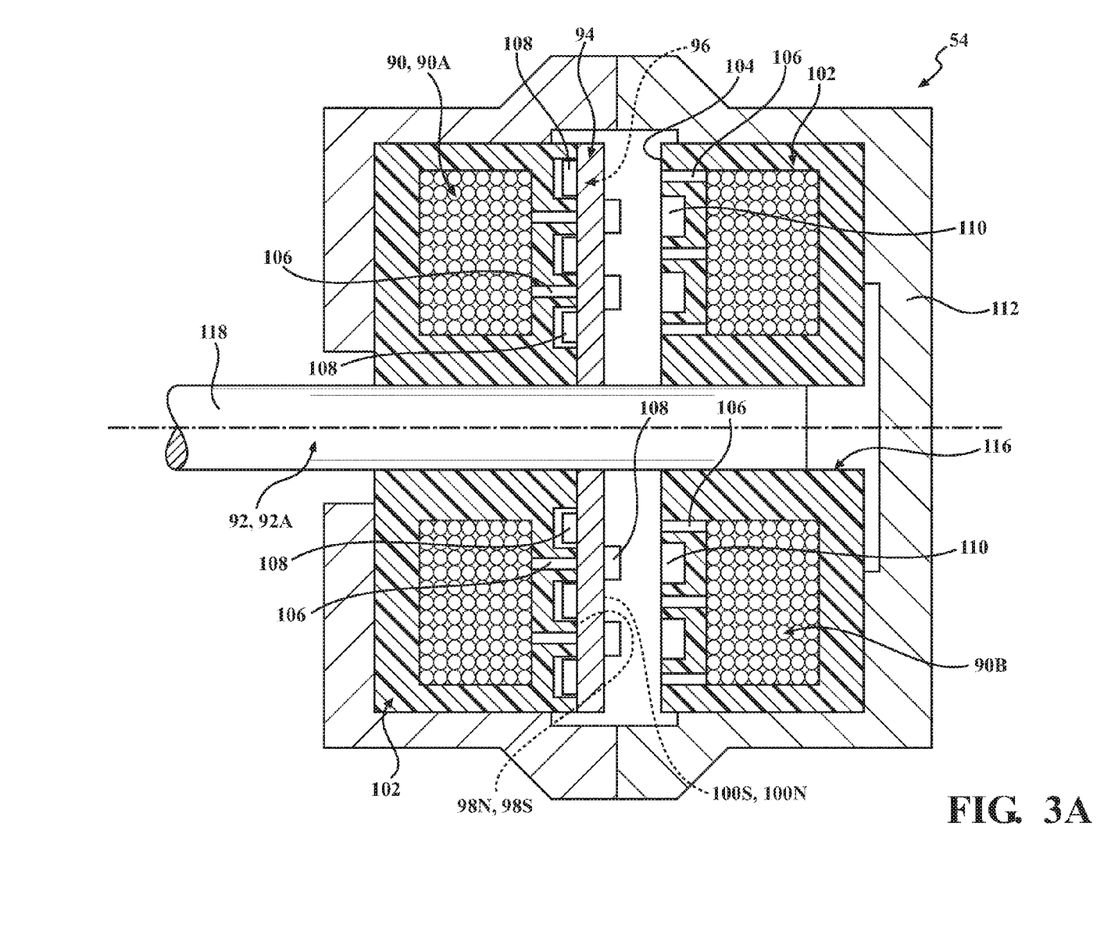
FIG. 3A is a sectional view of the actuator of the rotational disconnect assembly of FIGS. 1-2B showing an armature, armature flux guides, and slider in a first stable position.
Figure 3B:
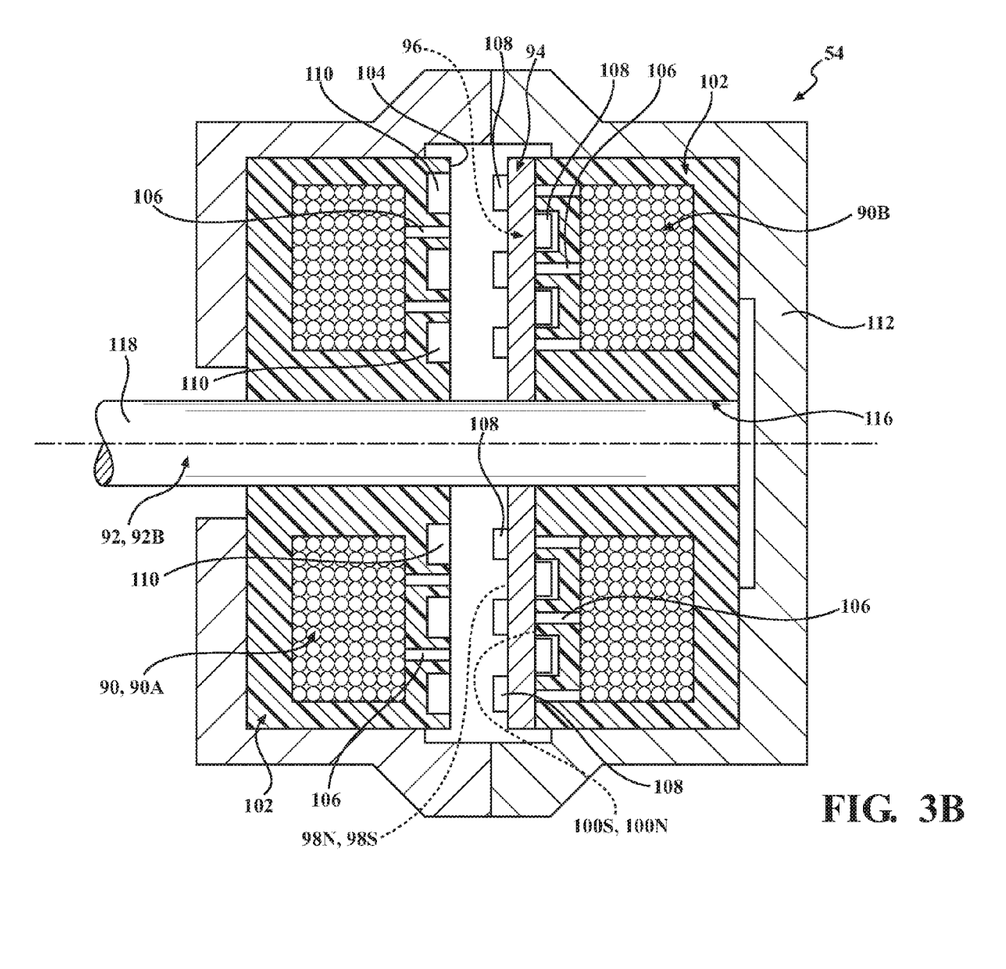
FIG. 3B is a sectional view of the actuator of the rotational disconnect assembly of FIG. 3A showing the armature, armature flux guides, and slider in a second stable position.

Referring now to FIGS. 3A and 3B, as noted above, the electromagnetic actuator 54 is adapted to selectively move the clutch assembly 52 between the configurations 52A, 52B. To that end, the electromagnetic actuator 54 includes a coil 90, a slider 92, and an armature 94. The coil 90 acts to selectively generate a magnetic field. The slider 92 is disposed in force translating relationship with the clutch assembly 52 and is selectively movable between a first stable position 92A and a second stable position 92B. The armature 94 is operatively attached to the slider 92 and has a predetermined magnetic polarity pattern 96. The magnetic polarity pattern 96 is defined by a plurality of north and south magnetic pole regions 98N, 98S facing toward the coil 90, and a corresponding plurality of south and north magnetic pole regions 100S, 100N facing away from the coil (see FIGS. 4A and 4B; described in greater detail below). The magnetic polarity pattern 96 is configured such that predetermined changes in the magnetic field generated by the coil 90 urge the slider 92 from one of the stable positions 92A to the other of the stable positions 92B so as to cause corresponding movement of the clutch assembly 52 between the engaged configuration 52A and the disengaged configuration 52B to selectively translate rotational torque between the first shaft 56 and the second shaft 58 of the driveline 12, as discussed above. The coil 90, the slider 92, the armature 94, and the magnetic polarity pattern 96 will each be described in greater detail below.

As noted above, the magnetic field generated by the coil 90 cooperates with the predetermined magnetic polarity pattern 96 of the armature 94 so as to move the slider 92 between the stable positions 92A, 92B. In the representative embodiment illustrated herein, the coil 90 is further defined as a first coil 90A acting to selectively generate a first magnetic field, and the electromagnetic actuator 54 also includes a second coil 90B acting to selectively generate a second magnetic field. The second coil 90B is spaced from the first coil 90A such that the first magnetic field and/or the second magnetic field urges the slider 92 from one of the stable positions 92A to the other of the stable positions 92B so as to cause corresponding movement of the clutch assembly 52 between the configurations 52A, 52B. To that end, the armature 94 is disposed between the first coil 90A and the second coil 90B. However, those having ordinary skill in the art will appreciate that the armature 94 could be disposed in any suitable location sufficient to move the slider 92 between the stable positions 92A, 92B, without departing from the scope of the present invention.

In one embodiment, the controller 48 is disposed in electrical communication with the coils 90A, 90B for selectively generating and/or reversing the polarity of the magnetic fields so as to move the slider 92 between the stable positions 92A, 92B. To that end, the controller 48 may be adapted to direct electrical charge through the coils 90A, 90B such that the magnetic fields are induced by the flow of electrical charges in the coils 90A, 90B. Here, a change in the direction of the flow of electrical charges in the coils 90A, 90B causes a corresponding reversal of the generated magnetic field. Those having ordinary skill in the art will appreciate that the controller 48 can be adapted to selectively flow current through each coil 90A, 90B either independently or simultaneously. Likewise, the controller 48 can be configured to selectively reverse current flow through each coil 90A, 90B either independently or simultaneously. Further, it will be appreciated that the coils 90A, 90B could be wound in opposite directions (for example, the first coil 90A could be wound clockwise and the second coil 90B could be wound counterclockwise) or, alternatively, both coils cold be would in the same direction (for example, both the first coil 90A and the second coil 90B could be wound clockwise). Moreover, while the electromagnetic actuator 54 illustrated herein utilizes a pair of coils 90A, 90B spaced on either side of the armature 94, it will be appreciated that a single coil (or, more than two coils) could be utilized without departing from the scope of the present invention. As such, for the purposes of clarity and consistency, subsequent discussion of the electromagnetic actuator 54 is directed to a single coil 90, unless otherwise indicated.

As will be appreciated from the subsequent description below, the stable positions 92A, 92B are configured so as to allow the electromagnetic actuator 54 to maintain the selected clutch assembly 52 configuration 52A, 52B without necessitating that the coil 90 be continuously energized. Those having ordinary skill in the art will recognize this as a so-called "bi-stable" electromagnetic actuator 54 configuration. Thus, the controller 48 could be configured so as momentarily direct electrical charges to the coil 90 until the clutch assembly 52 changes between configurations 52A, 52B, at which time the coil 90 could be subsequently de-energized. In particular, and because continuous application of electrical current is not required to hold the slider 92 in the stable positions 92A, 92B, the controller 48 could be configured to sense which of the stable positions 92A, 92B the slider 92 is in (and, thus, which of the configurations 52A, 52B the clutch assembly 52 is in), such as via measuring or otherwise determining inductance in the coil 90. The controller 48, also commonly referred to in the related art as an "electronic control module" may also be employed so as to control the transfer case 26, as noted above.

In one embodiment, the electromagnetic actuator 54 includes a coil brace 102 supporting the coil 90 and having a brace surface 104 spaced from the coil 90 and facing the armature 94. The electromagnetic actuator 54 may also include a coil flux guide 106 disposed between the coil 90 and the brace surface 104 for adjusting the magnetic field generated by the coil 90. In the representative embodiment illustrated herein, the electromagnetic actuator 54 includes a plurality of coil flux guides 106 that extend to the brace surface 104. However, those having ordinary skill in the art will appreciate that the electromagnetic actuator 54 could include any suitable number of coil flux guides 106 disposed or configured in any suitable way, or otherwise omitted entirely, without departing from the scope of the present invention. As is described in greater detail below, the coil flux guides 106 maybe adapted to adjust the magnetic field generated by the coil 90 so as to cooperate with the predetermined magnetic polarity pattern 96 of the armature 94. Similarly, in one embodiment, the electromagnetic actuator 54 may include at least one armature flux guide 108 operatively attached to the armature 94 for adjusting the predetermined magnetic polarity pattern 96 of the armature 94 with respect to the magnetic field generated directly by the coil 90 and/or adjusted by the coil flux guide 106. So as to optimize packaging size and space efficiency, in one embodiment, the coil brace 102 includes a pocket 110 for at least partially accommodating the armature flux guide 108. In the representative embodiment illustrated herein, the coil flux guide 106, the armature flux guide 108, and the pocket 110 have substantially annular, ring-shaped profiles and are substantially concentrically aligned with one another about the slider 92. However, those having ordinary skill in the art will appreciate that the coil flux guide 106, the armature flux guide 108, and/or the pocket 110 could be configured or aligned in any suitable way, with any suitable profile, without departing from the scope of the present invention. In one embodiment, the coil flux guide 106 and the armature flux guide 108 are manufactured from a ferrous material. However, it will be appreciated that any suitable material could be used without departing from the scope of the present invention.

As noted above, the slider 92 of the electromagnetic actuator 54 is operatively attached to the armature 94 and is disposed in force translating relationship with the clutch assembly 52. More specifically, the slider 92 is disposed in force translating relationship with the fork 88 of the clutch assembly 52. In the representative embodiment illustrated herein, the electromagnetic actuator 54 includes an actuator housing 112 and a mounting housing 114. The actuator housing 112 supports the coil 90, the slider 92, and the armature 94. Likewise, the mounting housing 114 supports the actuator housing 112 and the fork shaft 89, and is operatively attached to the knuckle bracket 44. It will be appreciated that the electromagnetic actuator 54 could be operatively attached to and/or supported by the knuckle bracket 44 in a number of different ways and, thus, the actuator housing 112 and/or the mounting housing 114 could be configured in any suitable way, or could be omitted entirely, without departing from the scope of the present invention.

Referring again to FIGS. 2A-3B, the actuator housing 112 has a cylinder 116 defined therein that supports the slider 92. In this embodiment, the slider 92 is further defined as a shaft 118 supported in and movable along the cylinder 116 between the stable positions 92A, 92B. Thus, the armature 94 is operatively attached to the shaft 118 such that predetermined changes in the magnetic field generated by the coil 90 urge the shaft 118 along the cylinder 116, whereby the shaft 118 translates force to the fork 88 which, in turn, slides along the fork shaft 89 and translates force to the sleeve 86 so as to move the clutch assembly 52 between the configurations 52A, 52B, as described above. However, those having ordinary skill in the art will appreciate that the slider 92 could be configured differently, without the use of a shaft 118 as described herein, without departing from the scope of the present invention. Thus, the slider 92 could be defined in any suitable way sufficient to selectively translate force to the clutch assembly 52. In one embodiment, at least one spring 120 is interposed between the actuator housing 112 and the shaft 118. The spring 120 cooperates with the coil 90 so as to urge the shaft 118 from one stable position 92A (or, 92B) to the other stable position 92B (or, 92A), as is described in greater detail below.

In the representative embodiment illustrated throughout the figures, the armature 94 is operatively attached to the shaft 118 for concurrent movement between the stable positions 92A, 92B. Here, the armature 94 is a unitary, one-piece component and has a substantially annular profile. More specifically, the armature 94 has a substantially ring-shaped profile. However, those having ordinary skill in the art will appreciate that the armature 94 could have any suitable configuration sufficient to cooperate with the coil 90 so as to urge the slider 92 between the stable positions 92A, 92B without departing from the scope of the present invention.

Figure 4A:
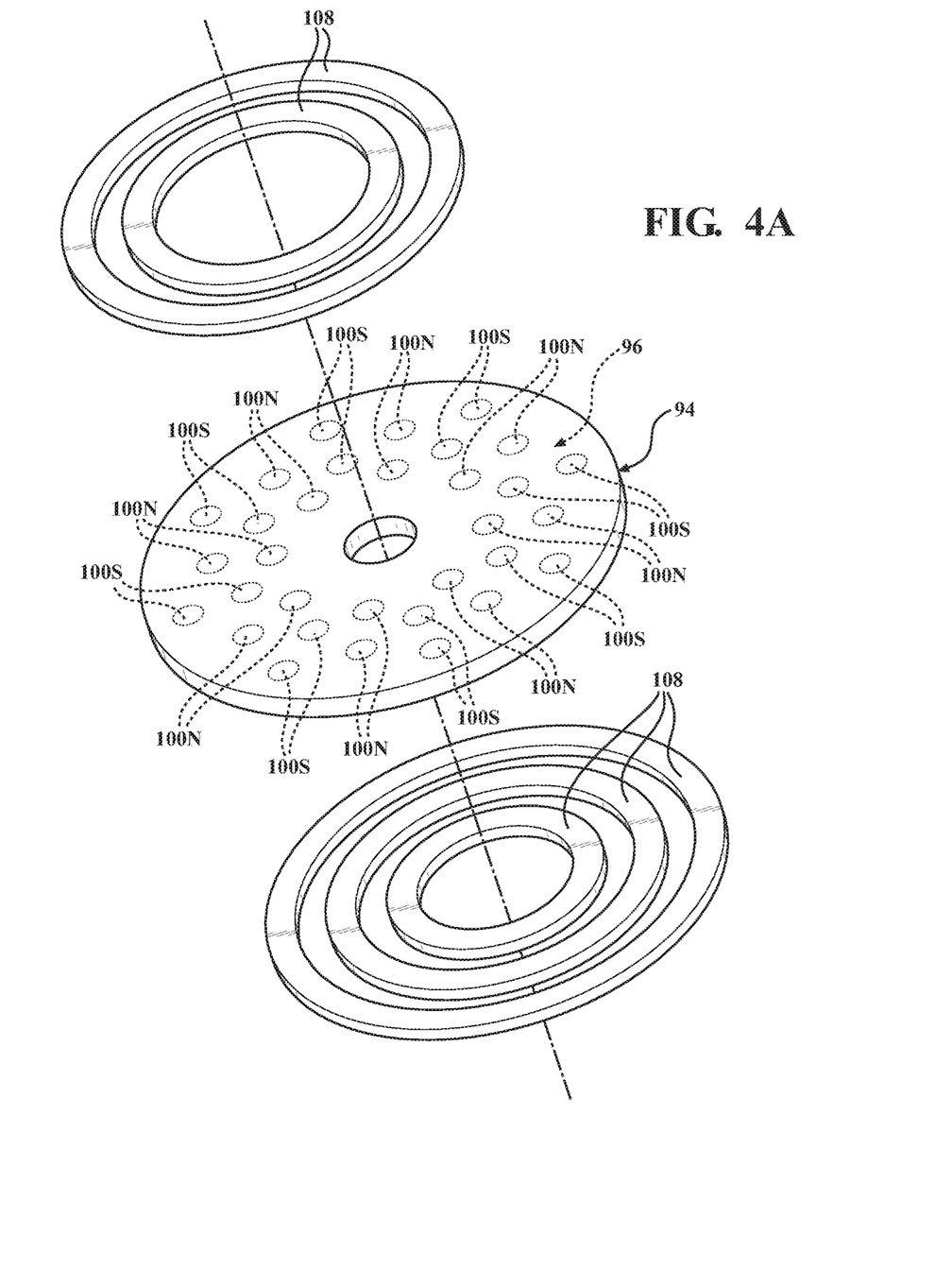
FIG. 4A is a partially exploded perspective view of the armature and armature flux guides of FIGS. 3A-3B showing a predetermined magnetic polarity pattern of the armature.
Figure 4B:
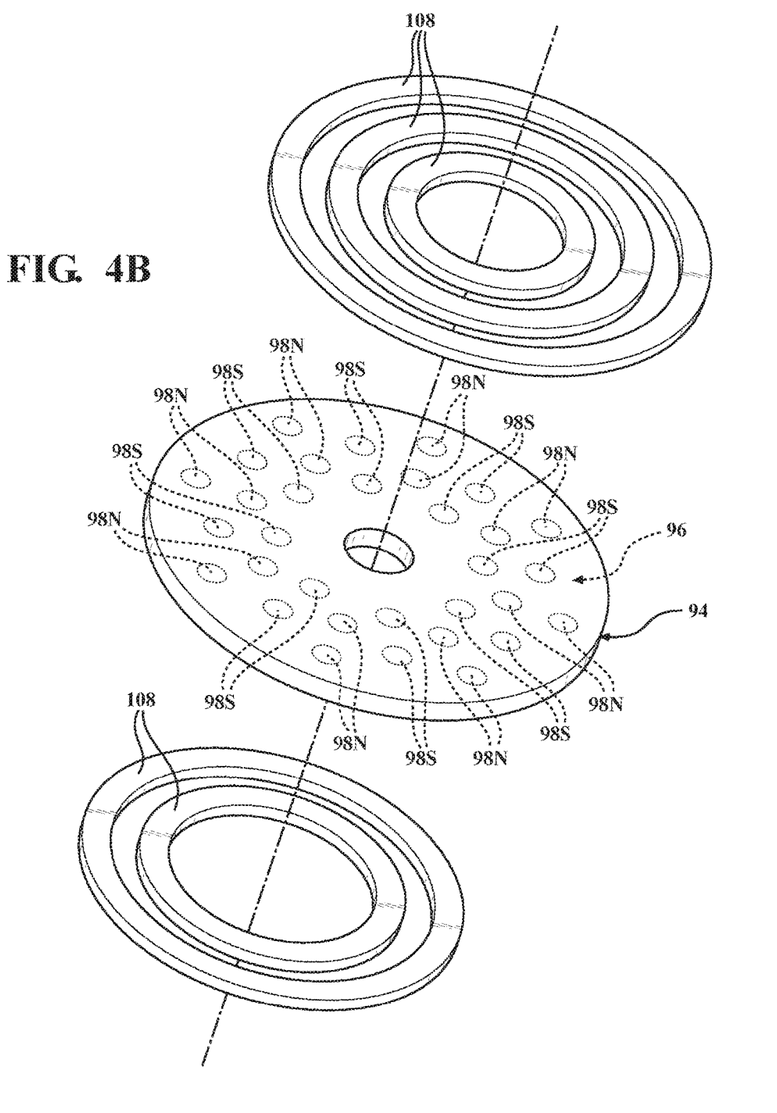
FIG. 4B is an alternate partially exploded perspective view of the armature and armature flux guides of FIG. 4A.

Referring now to FIGS. 4A and 4B, as noted above, the armature 94 has a predetermined magnetic polarity pattern 96 defined by a plurality of magnetic pole regions 98N, 98S, 100S, 100N. For the purposes of clarity and consistency, each respective north magnetic pole region 98N faces toward the coil 90 and has a corresponding south magnetic pole region 100S facing away from the coil 90 (see also FIGS. 3A and 3B). Likewise, each respective south magnetic pole region 98S faces toward the coil 90 and has a corresponding north magnetic pole region 100N facing away from the coil 90. As will be appreciated from the subsequent description below, while the number of north magnetic pole regions 98N facing the coil 90 that are implemented into the armature 94 can vary from the number of south magnetic pole regions 98N facing the coil, depending on the application, each north magnetic pole region 98N facing the coil 90 has a corresponding south magnetic pole region 100S facing away from the coil 90. Thus, by way of non-limiting example, the armature 94 could include ten north magnetic pole regions 98N and two south magnetic pole regions 98S facing toward the coil 90, with a corresponding ten south magnetic pole regions 100S and two north magnetic pole regions 100N facing away from the coil 90.

The magnetic polarity pattern 96 of the armature 94 is implemented using so-called "printed polarity magnet" technology (also commonly referred to in the related art as a "coded magnet" or a "programmable magnet"), whereby rather than generating one discrete north pole and a corresponding south pole, printed magnet technology enables a permanent magnet to generate a magnetic field with multiple north and south poles arranged in predetermined ways. Essentially, by exposing a conventional magnet to a predetermined magnetic field and subsequently heating the magnet to its Curie temperature, the magnet adopts a permanent magnetic field pattern that corresponds to the exposed magnetic field and will subsequently generate this adopted magnetic field pattern. Thus, the armature 94 is realized by a conventional magnet with a printed predetermined magnetic polarity pattern 96 configured to cooperate with the magnetic field generated by the coil 90 so as to move the slider 92 between the stable positions 92A, 92B, as described above.

It will be appreciated that the predetermined magnetic polarity pattern 96 can be configured in a number of different ways, depending on application requirements and, in particular, the specific packaging size and force requirements of the electromagnetic actuator 54. In one embodiment, the magnetic pole regions 98N, 98S (and 100S, 100N) are radially arranged about the armature 94 in a predetermined pattern so as to cooperate with the magnetic field generated by the coil 90 so as to move the slider 92 between the stable positions 92A, 92B. Similarly, in one embodiment, the magnetic pole regions 98N, 98S (and 100S, 100N) are sized so as to cooperate with the magnetic field generated by the coil 90 so as to move the slider 92 between the stable positions 92A, 92B. Moreover, in one embodiment, a predetermined quantity of the magnetic pole regions 98N, 98S (and, 100S, 100N) are included so as to cooperate with the magnetic field generated by the coil 90 so as to move the slider 92 between the stable positions 92A, 92B. By adjusting the so-called "code density" magnetic polarity pattern 96 (the size, position, and arrangement of the magnetic pole regions 98N, 98S; 100S, 100N), the armature 94 can configured to properly correspond with the magnetic field generated coil 90. Specifically, all other things being equal, adjusting the code-density of the magnetic polarity pattern 96 can decrease the required strength of the magnetic field of the coil 90, as well as the travel distance of the slider 92 between the stable positions 92A, 92B. Thus, the flexibility in the configuration of the magnetic polarity pattern 96 affords opportunities to reduce the size of the armature 94, the slider 92, and the coil 90 so as to significantly optimize the overall packaging size and weight of the electromagnetic actuator 54.

In the embodiment illustrated in FIGS. 4A and 4B, the predetermined magnetic polarity pattern 96 includes a total of sixteen north magnetic pole regions 98N facing toward the coil 90 arranged in two ring-shaped sets of eight (and, a corresponding sixteen south magnetic pole regions 100S facing away from the coil 90; see FIG. 4B), as well as sixteen south magnetic pole regions 98S facing toward the coil 90 arranged in two ring-shaped sets of eight (and, a corresponding sixteen north magnetic pole regions 100N facing away from the coil 90; see FIG. 4B). Here, each of the magnetic pole regions 98N, 98S (and 100S, 100N) are substantially the same size and are arranged concentrically in groups with substantially equivalent respective radial spacing. The magnetic field generated by this magnetic polarity pattern 96 may be directed by the armature flux guides 108 so as to cooperate with the magnetic field selectively generated by the coil 90 (and, in one embodiment, directed by the coil flux guides 106) so as to move the shaft 118 between the stable positions 92A, 92B, as discussed above.

In this way, the rotational disconnect assembly 50 of the present significantly improves the performance of vehicle powertrain systems 10 by enabling simple and space-efficient implementation of selective rotational torque interruption. More specifically, those having ordinary skill in the art will appreciate that the disconnect assembly 50 of the present invention is configured such that the clutch assembly 52 can remain in either configuration 52A, 52B without necessitating that the electromagnetic actuator 54 be continuously supplied with electrical current. Moreover, it will be appreciated that the predetermined magnetic polarity pattern 96 of the armature 94 can be configured so as to significantly minimize the overall packaging size of the electromagnetic actuator 54 and disconnect assembly 50. Further, the present invention can be used in connection with a number of different types of powertrain systems 10, in a number of different ways, and reduces the cost and complexity of manufacturing vehicles that have superior operational characteristics, such as high efficiency, reduced weight, component packaging, component life, and vehicle drivability.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A disconnect assembly for use in selectively translating rotational torque between a first shaft and a second shaft of a vehicle driveline, said disconnect assembly comprising:
    a clutch assembly disposed in selective torque translating relationship between the first shaft and the second shaft, and movable between: an engaged configuration wherein rotational torque is translated between the first shaft and the second shaft, and a disengaged configuration wherein rotational torque is interrupted between the first shaft and the second shaft; and
    an electromagnetic actuator including:
    a coil that acts to selectively generate a magnetic field,
    a slider disposed in force translating relationship with said clutch assembly and selectively movable between a first stable position and a second stable position,
    an armature operatively attached to said slider and having a predetermined magnetic polarity pattern defined by a plurality of north and south magnetic pole regions facing toward said coil and a corresponding plurality of south and north magnetic pole regions facing away from said coil, said magnetic polarity pattern is radially arranged about said armature and configured such that predetermined changes in said magnetic field generated by said coil urge said slider from one of said stable positions to the other of said stable positions so as to cause corresponding movement of said clutch assembly between said configurations to selectively translate rotational torque between the first shaft of the driveline and the second shaft of the driveline.

2. The disconnect assembly as set forth in claim 1, wherein said magnetic pole regions are sized so as to cooperate with said magnetic field generated by said coil to move said slider between said stable positions.

3. The disconnect assembly as set forth in claim 1, including a predetermined quantity of said magnetic pole regions sufficient to cooperate with said magnetic field generated by said coil to move said slider between said stable positions.

4. The disconnect assembly as set forth in claim 1, wherein said armature is a unitary, one-piece component.

5. The disconnect assembly as set forth in claim 1, wherein said armature has a substantially annular profile.

6. The disconnect assembly as set forth in claim 1, wherein said actuator further includes a coil brace supporting said coil and having a brace surface spaced from said coil and facing said armature; and at least one coil flux guide disposed between said coil and said brace surface for adjusting said magnetic field generated by said coil.

7. The disconnect assembly as set forth in claim 6, further including at least one armature flux guide operatively attached to said armature for adjusting said magnetic polarity pattern of said armature with respect to said magnetic field adjusted by said coil flux guide.

8. The disconnect assembly as set forth in claim 7, wherein said coil brace includes a pocket for accommodating said armature flux guide.

9. The disconnect assembly as set forth in claim 7, wherein said coil flux guide and/or said armature flux guide is manufactured from a ferrous material.

10. The disconnect assembly as set forth in claim 7, wherein said coil flux guide and said armature flux guide have substantially ring-shaped profiles.

11. The disconnect assembly as set forth in claim 10, wherein said coil flux guide and said armature flux guide are concentrically aligned.

12. The disconnect assembly as set forth in claim 1, wherein said coil is further defined as a first coil acting to selectively generate a first magnetic field, and wherein said disconnect assembly further includes a second coil spaced from said first coil and acting to selectively generate a second magnetic field, said first magnetic field and/or said second magnetic field urging said slider from one of said stable positions to the other of said stable positions so as to cause corresponding movement of said clutch assembly between said configurations.

13. The disconnect assembly as set forth in claim 12, wherein said armature is disposed between said first coil and said second coil.

14. The disconnect assembly as set forth in claim 12, further including a controller in electrical communication with said first coil and said second coil for selectively generating and/or reversing the polarity of said first magnetic field and/or said second magnetic field so as to move said slider between said stable positions.

15. The disconnect assembly as set forth in claim 1, wherein said actuator further includes an actuator housing with a cylinder defined therein, and wherein said slider is further defined as a shaft supported by and moveable along said cylinder between said stable positions.

16. The disconnect assembly as set forth in claim 15, wherein said clutch assembly includes a sleeve disposed in force translating relationship with said shaft, said sleeve acting to couple the first shaft and the second shaft when said clutch assembly is in said engaged configuration.

17. The disconnect assembly as set forth in claim 16, further including a fork operatively attached to said shaft and disposed in force translating relationship with said sleeve.

18. The disconnect assembly as set forth in claim 16, further including at least one spring interposed between said actuator housing and said shaft, said spring cooperating with said coil to urge said shaft from one of said stable positions to the other of said stable positions.

* * * * *